(12) United States Patent
Ke et al.

(10) Patent No.: US 10,957,281 B2
(45) Date of Patent: Mar. 23, 2021

(54) PHOTOGRAPHING METHOD BY SMART TELEVISION AND SYSTEM THEREOF

(71) Applicant: SHENZHEN TCL NEW TECHNOLOGY CO., LTD, Guangdong (CN)

(72) Inventors: Jieyan Ke, Guangdong (CN); Yanxing Qi, Guangdong (CN); Liangjun Meng, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 80 days.

(21) Appl. No.: 16/309,985

(22) PCT Filed: Aug. 22, 2016

(86) PCT No.: PCT/CN2016/096245
§ 371 (c)(1),
(2) Date: Dec. 14, 2018

(87) PCT Pub. No.: WO2017/215116
PCT Pub. Date: Dec. 21, 2017

(65) Prior Publication Data
US 2019/0172420 A1 Jun. 6, 2019

(30) Foreign Application Priority Data

Jun. 15, 2016 (CN) .......................... 201610428254.2

(51) Int. Cl.
*G09G 5/10* (2006.01)
*G09G 3/34* (2006.01)
*H04N 5/235* (2006.01)

(52) U.S. Cl.
CPC ................. *G09G 5/10* (2013.01); *G09G 3/34* (2013.01); *H04N 5/235* (2013.01);
(Continued)

(58) Field of Classification Search
CPC ............ G09G 5/10; G09G 2320/0626; G09G 2320/0233; H04N 5/2354; H04N 5/2351
See application file for complete search history.

(56) References Cited

U.S. PATENT DOCUMENTS 8,421,898 B2   4/2013 Pang et al.
9,210,334 B2 * 12/2015 Toyoda ................ H04N 5/2355
(Continued)

FOREIGN PATENT DOCUMENTS

CN       101212552 A    7/2008
CN       103312986 A    9/2013
(Continued)

OTHER PUBLICATIONS

International Search Report of PCT Patent Application No. PCT/CN2016/096245 dated Mar. 7, 2017.
(Continued)

*Primary Examiner* — Shaheda A Abdin

(57) ABSTRACT

Disclosed are a photographing method by a smart television and system thereof. The method includes acquiring a picture of an environment captured by a camera of the smart television, when the smart television is photographing; determining a brightness value of current environment of the smart television, based on the picture of the environment; when the brightness value of the environment is less than a preset value, gradually increasing screen brightness of the smart television and showing a preview image of the picture at different screen brightness; and after a required screen brightness is selected by the user according to the preview image of the picture, adjusting the screen brightness to the required screen brightness selected by the user, for the user to be photographed.

13 Claims, 10 Drawing Sheets

(52) U.S. Cl.
CPC ......... *H04N 5/2351* (2013.01); *H04N 5/2354* (2013.01); *G09G 2320/0233* (2013.01); *G09G 2320/0626* (2013.01)

(56) References Cited

U.S. PATENT DOCUMENTS

| | | | |
|---|---|---|---|
| 2001/0020983 A1* | 9/2001 | Lee | G06T 5/009 |
| | | | 348/687 |
| 2005/0156949 A1* | 7/2005 | Tsou | G09G 5/10 |
| | | | 345/690 |
| 2006/0159340 A1* | 7/2006 | Lee | H04N 5/23293 |
| | | | 382/169 |
| 2007/0216958 A1 | 9/2007 | Narukawa et al. | |
| 2008/0175448 A1* | 7/2008 | Fujiwara | G06K 9/00208 |
| | | | 382/118 |
| 2009/0251587 A1* | 10/2009 | Kim | H04N 5/23293 |
| | | | 348/333.12 |
| 2009/0322889 A1 | 12/2009 | Kujawa et al. | |
| 2012/0026378 A1 | 2/2012 | Pang et al. | |
| 2014/0006033 A1* | 1/2014 | Jung | G06F 3/041 |
| | | | 704/275 |
| 2014/0192247 A1* | 7/2014 | Cheong | G06F 3/016 |
| | | | 348/333.11 |
| 2015/0002735 A1 | 1/2015 | Moskovchenko | |
| 2015/0212575 A1* | 7/2015 | Song | G06F 3/167 |
| | | | 345/156 |
| 2015/0310637 A1* | 10/2015 | Zhong | H04N 5/23222 |
| | | | 348/207.1 |
| 2017/0315772 A1* | 11/2017 | Lee | G09G 5/10 |

FOREIGN PATENT DOCUMENTS

| | | |
|---|---|---|
| CN | 103795929 A | 5/2014 |
| CN | 103856823 A | 6/2014 |
| CN | 104184956 A | 12/2014 |
| CN | 104349033 A | 2/2015 |
| CN | 104660766 A | 5/2015 |
| CN | 104994274 A | 10/2015 |
| CN | 105323382 A | 2/2016 |
| CN | 105426068 A | 3/2016 |
| CN | 105554413 A | 5/2016 |
| CN | 105578055 A | 5/2016 |
| CN | 105872402 A | 8/2016 |
| WO | 2014086218 A1 | 6/2014 |

OTHER PUBLICATIONS

The extended European Search Report of counterpart European Patent Application No. 16905229.7 dated Jan. 24, 2020.

* cited by examiner

PHOTOGRAPHING METHOD BY SMART TELEVISION AND SYSTEM THEREOF

TECHNICAL FIELD

The present disclosure relates to the technical field of photographing, and in particular to a photographing method by a smart television and a system thereof.

BACKGROUND

Currently, there has been increasing functions on smart televisions. Users can be photographed or be videoed, for example, through a built-in or an external camera of a smart television, which brings the smart television of greater importance in daily life. Accordingly, the smart television with a better photographing function may possibly be more attractive to the users.

However, flash fails to work in the camera of the smart television at present. Thus, other light sources, such as light of a lamp, should be provided to ensure a clear photo, once the smart television is placed in a dark environment. If brightness of other light sources is not sufficient, an unclear photo may be produced by the camera of the smart television.

SUMMARY

The present disclosure intends to provide a photographing method by a smart television and a system thereof, attempting to solve the problems that the camera of the smart television fails to flash and no clear photos can be taken in the dark environment.

To fulfill such an intention, the present disclosure provides a photographing method by smart television, which includes:

acquiring a picture of an environment captured by a camera of the smart television, when the smart television is photographing;

acquiring a brightness value of each pixel in the picture of the environment;

taking an average of the acquired brightness value of each pixel in the picture of the environment as a brightness value of the environment;

indicating directly a user to be photographed, when the brightness value of the environment is not less than a preset value;

gradually increasing screen brightness of the smart television and showing a preview image of the picture at different screen brightness, when the brightness value of the environment is less than the preset value; and adjusting the screen brightness to the required screen brightness selected by the user, for the user to be photographed, after a required screen brightness is selected by the user according to the preview image of the picture.

To fulfill the above-mentioned intention, the present disclosure also provides another photographing method by smart television, which includes:

acquiring a picture of an environment captured by a camera of the smart television, when the smart television is photographing;

determining a brightness value of current environment of the smart television, based on the picture of the environment;

gradually increasing screen brightness of the smart television and showing a preview image of the picture at different screen brightness, when the brightness value of the environment is less than a preset value; and adjusting the screen brightness to the required screen brightness selected by the user, for the user to be photographed, after a required screen brightness is selected by the user according to the preview image of the picture.

Preferably, the step of adjusting the screen brightness to the required screen brightness selected by the user, for the user to be photographed includes:

switching a display interface of a screen of the smart television into a full white screen, and setting brightness of the screen as the required screen brightness selected by the user; and indicating the user to be photographed, when the screen brightness becomes the required screen brightness selected by the user.

Preferably, the method further includes:

saving a current screen brightness for restoring the screen brightness of the smart television to the current screen brightness after photographing is completed, when the brightness value of current environment is less than the preset value. Preferably, the step of adjusting the screen brightness to the required screen brightness selected by the user, for the user to be photographed includes:

switching the display interface of the screen of the smart television into the full white screen, and setting brightness of the full white screen as the required screen brightness selected by the user; and indicating the user to be photographed, after the screen brightness becomes the required screen brightness selected by the user.

Preferably, the method further includes:

indicating a user to be photographed, when the brightness value of the environment is not less than the preset value.

Preferably, the step of adjusting the screen brightness to the required screen brightness selected by the user, for the user to be photographed includes:

switching the display interface of the screen of the smart television into the full white screen, and setting brightness of the full white screen as the required screen brightness selected by the user; and indicating the user to be photographed, after the screen brightness becomes the required screen brightness selected by the user.

Preferably, the step of determining a brightness value of current environment of the smart television, based on the picture of the environment includes:

acquiring a brightness value of each pixel in the picture of the environment; and taking an average of the acquired brightness value of each pixel in the picture of the environment as brightness value of the environment.

Preferably, the step of adjusting the screen brightness to the required screen brightness selected by the user, for the user to be photographed includes:

switching the display interface of the screen of the smart television into the full white screen, and setting brightness of the full white screen as the required screen brightness selected by the user; and indicating the user to be photographed, after the screen brightness becomes the required screen brightness selected by the user.

In addition to fulfill the above intention, the present disclosure further discloses a photographing system of smart television, which includes:

an acquiring module, configured to acquire a picture of an environment captured by a camera of the smart television, when the smart television is photographing;

a determining module, configured to determine a brightness value of current environment of the smart television, based on the picture of the environment;

a displaying module, configured to gradually increase screen brightness of the smart television and to show a preview image of the picture at different screen brightness, when the brightness value of the environment is less than a preset value;

a first adjusting module, configured to adjust the screen brightness to a required screen brightness selected by the user, for the user to be photographed, after a required screen brightness is selected by the user according to the preview image of the picture.

Preferably, the first adjusting module includes:

a switching unit, configured to switch a display interface of a screen of the smart television into a full white screen, and to set brightness of the full white screen as the required screen brightness selected by the user; and an indicating unit, configured to indicate the user to be photographed, when the screen brightness becomes the required screen brightness selected by the user.

Preferably, the photographing system of smart television further includes:

a second adjusting module, configured to save a current screen brightness for restoring the screen brightness of the smart television to the current screen brightness after photographing is completed, when the brightness value of current environment is less than the preset value.

Preferably, the first adjusting module includes:

a switching unit, configured to switch a display interface of a screen of the smart television into a full white screen, and to set brightness of the full white screen as the required screen brightness selected by the user; and an indicating unit, configured to indicate the user to be photographed, when the screen brightness becomes the required screen brightness selected by the user.

Preferably, the photographing system of smart television further includes:

an indicating module, configured to indicate the user directly to be photographed, when the brightness value of the environment is not less than the preset value.

Preferably, the first adjusting module includes:

a switching unit, configured to switch a display interface of a screen of the smart television into a full white screen, and to set brightness of the full white screen as the required screen brightness selected by the user; and an indicating unit, configured to indicate the user to be photographed, after the screen brightness becomes the required screen brightness selected by the user.

Preferably, the determining module includes:

an acquiring module, configured to acquire a brightness value of each pixel in the picture of the environment;

a determining module, configured to take an average of the acquired brightness value of each pixel in the picture of the environment as a brightness value of the environment.

Preferably, the first adjusting module includes:

a switching unit, configured to switch a display interface of a screen of the smart television into a full white screen, and to set brightness of the full white screen as the required screen brightness selected by the user;

an indicating unit, configured to indicate the user to be photographed, when the screen brightness becomes the required screen brightness selected by the user.

The smart television of the present disclosure takes photos by acquiring the picture of the environment captured by the camera of the smart television, when the smart television is photographing; determining the brightness value of current environment of the smart television, based on the picture of the environment; gradually increasing screen brightness of the smart television and showing the preview image of the picture at different screen brightness, when the brightness value of the environment is less than the preset value; and adjusting the screen brightness to the required screen brightness selected by the user, for the user to be photographed, after a required screen brightness is selected by the user according to the preview image of the picture. The smart television would acquire the current brightness value of the environment during the photographing process. If the brightness value of the environment is less than the preset value, indicating that the smart television is photographing at a dark environment. The user would be clearly photographed through adjusting the screen brightness to the required screen brightness selected by the user, based on the brightness of the current environment. Thus, even if the smart television is in a dark environment, the camera of the smart television could still take clear photos by means of the brightness of the smart television.

Further description would be provided with the implementation, functional features and advantages of the present disclosure, with the exemplary embodiments combined and accompanying drawings referred to.

DETAILED DESCRIPTION OF THE EMBODIMENTS

It is understood that the specific embodiments described herein are merely illustrative of the present disclosure but not for limitation.

Given to the above-mentioned problems, the present disclosure provides a photographing method of smart television.

Figure 1:
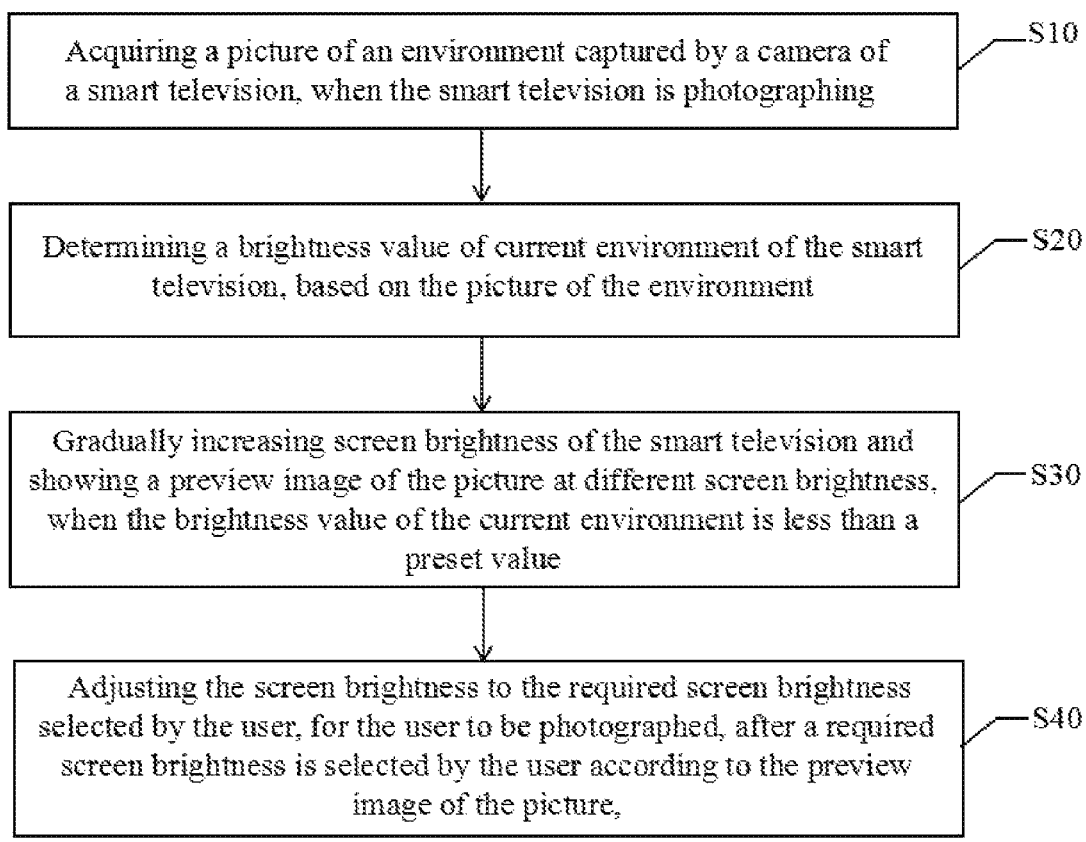
FIG. 1 shows a schematic flow diagram in a first exemplary embodiment of the photographing method by smart television in the present disclosure.

Referring to FIG. 1, FIG. 1 shows a flow diagram in a first exemplary embodiment of the photographing method by smart television in the present disclosure.

In the first exemplary embodiment, the photographing method by the smart television includes:

step S10, acquiring a picture of an environment captured by a camera of the smart television, when the smart television is photographing;

step S20, determining a brightness value of current environment of the smart television, based on the picture of the environment.

In the present exemplary embodiment, when it is detected that the user opens an APP on the smart television for photographing, the picture of the current environment would be captured by the camera linked with the smart television, and the picture of the current environment would be displayed on a viewfinder interface. When the user presses a camera key and the photographing process is detected, and the picture of the environment captured by the camera of the smart television would be acquired, and the brightness value of current environment of the smart television is determined, based on the brightness value corresponding to the picture of the environment. The picture of the environment acquired could be a full picture of the environment in the viewfinder interface of the smart television, or it could also be a portion thereof. The brightness range of the current environment of the smart television is [0, 255].

Step 30, gradually increasing screen brightness of the smart television and displaying a preview image of the picture at different screen brightness, when the brightness value of the current environment is less than the preset value.

When determining the brightness value of current environment of the smart television, the brightness value of the current environment is compared with the preset value, and it is determined if the brightness value of the current environment is less than the preset value. If the brightness value of the current environment is less than the preset value, parameters regarding the screen brightness of the smart television would be adjusted according to the brightness value of the current environment, to gradually increase the screen brightness of the smart television. In the meanwhile, the preview image of the picture would be displayed at the adjusted screen brightness. The parameters regarding the screen brightness may include a backlight value, a brightness value and a contrast ratio. For example, the captured brightness value of the current environment of the smart television is Lt, and the preset value of the smart television is L0. Lt is compared with L0. If Lt is less than L0, parameters regarding the screen brightness of the smart television would be adjusted according to Lt, and the screen brightness of the smart television would be gradually increased. And the preview image of the picture would also be displayed at the adjusted screen brightness. The range of the preset value is [65, 75].

Step S40, adjusting the screen brightness is adjusted to the required screen brightness selected by the user, for the user to be photographed, after a required screen brightness is selected by the user according to the preview image of the picture.

After the user press the camera key on the APP with the photographing function, each preview image of the picture captured by the camera is shown on the display interface of the smart television. The user is also indicated if the screen brightness corresponding to the preview image of the picture is set as the screen brightness that would be required for further photographing. For example, when the user clicks some preview image of the picture, a question that "if the screen brightness corresponding to the preview image of the picture is set as the screen brightness that would be required for photographing" would be popped up. The user's selection would be accepted, so that the screen brightness required for further photographing could be rapidly confirmed. Or when the user quits browsing the preview image of the picture, the question that "if the screen brightness corresponding to the preview image of the picture is set as the screen brightness that would be required for photographing" would be popped up. And the user's selection would be accepted. Or the user would be indicated of the question at the end of browsing the preview image of the picture, and the user's selection would be accepted. After a required screen brightness is selected by the user according to the preview image of the picture, the screen brightness is adjusted to the selected screen brightness, for the user to be photographed. Flash is performed simultaneously on the display of the smart television when the camera is photographing. When photographing has been completed by the camera, the screen brightness of the smart television has been restored to the screen brightness selected by the user.

It has to be noted that if "no" is selected regarding the question "if the screen brightness corresponding to the preview image of the picture is set as the screen brightness that would be required for photographing", when the user clicks some preview image of the picture. Current preview image of the picture would be quit and the user may continue browsing each preview image of the picture.

The smart television of the present exemplary embodiment takes photos by acquiring the picture of the environment captured by the camera of the smart television, when the smart television is photographing, determining the brightness value of current environment of the smart television, based on the picture of the environment, gradually increasing screen brightness of the smart television and showing a preview image of the picture at different screen brightness, when the brightness value of the environment is less than the preset value; and adjusting the screen brightness to the required screen brightness selected by the user, for the user to be photographed, after a required screen brightness is selected by the user according to the preview image of the picture. The smart television would acquire the current brightness value of the environment during the photographing process. If the brightness value of the environment is less than the preset value, indicating a dark environment during photographing by the smart television. The user would be clearly photographed through adjusting the screen brightness to the required screen brightness selected by the user, based on the brightness of the current environment. Thus, even if the user is in a dark environment, the camera of the smart television could still take clear photos by aids of the brightness of the smart television.

Figure 2:
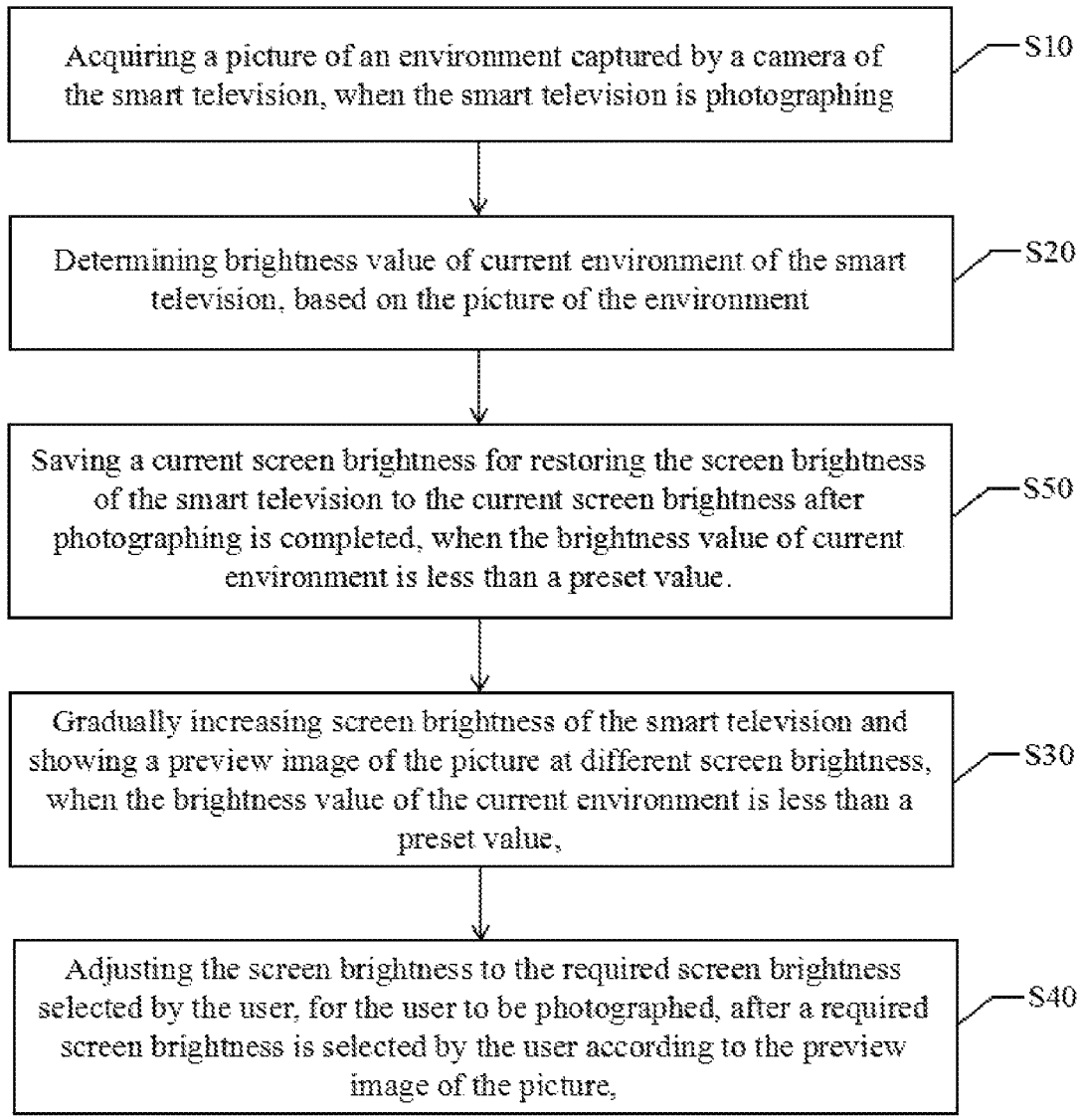
FIG. 2 shows a schematic flow diagram in a second exemplary embodiment of the photographing method by smart television in the present disclosure.

Further, based on the first exemplary embodiment, the schematic flow diagram in a second exemplary embodiment is provided of the photographing method by the smart television in the present disclosure, referring to FIG. 2. In the second exemplary embodiment, the photographing method by the smart television after S20 includes:

step S50, saving a current screen brightness for restoring the screen brightness of the smart television to the current screen brightness after photographing is completed, when the brightness value of current environment is less than the preset value.

If the brightness value of the current environment of the smart television is less than the preset value, indicating dark environment brightness for photographing, and thus clear photos could not be photographed by the camera of the smart television. The screen brightness is necessarily adjusted to the required screen brightness selected by the user, and the current screen brightness of the smart television is saved. Flash is performed simultaneously on the display of the smart television when the camera is photographing with the required screen brightness. When photographing has been completed by the camera, the screen brightness of the smart television has been restored to the current screen brightness of the smart television just saved. Thus, other operations, such as displaying pictures, is performed under the current screen brightness of the smart television just saved. For example, if the brightness value of the current environment is Lt1 (Lt1=60), which is less than the preset value L0 (L0=70), Lt2 would be saved and Lt2 would be adjusted to the required screen brightness selected by the user, which is Lt3 (Lt3=80). Flash is performed simultaneously on the display of the smart television when the camera is photographing at the brightness of Lt3. When photographing has been completed by the camera, the screen brightness Lt3 has been restored to Lt2.

It could be understandable that the darker of the current environment of the smart television, the smaller of the brightness value of the current environment of the smart television, the larger of the required screen brightness value. And the brighter of the current environment of the smart television, the larger of the brightness value of the current environment of the smart television, the smaller of the required screen brightness value.

The present exemplary embodiment, when the brightness value of current environment is less than the preset value, avoids the screen from possibility of aging under a high brightness condition for a long time, by means of saving the brightness value of current environment, and of adjusting the screen brightness of the smart television to the current screen brightness after photographing is completed.

Figure 3:
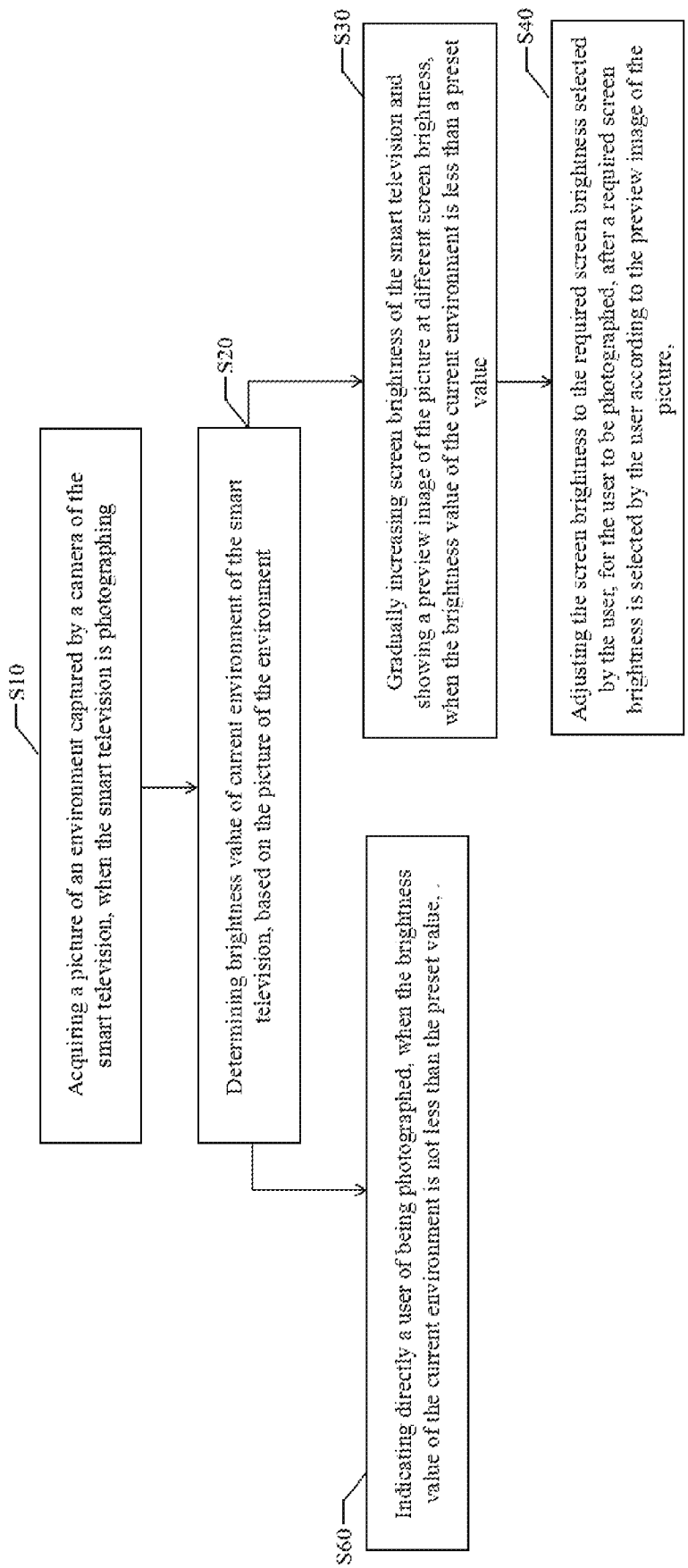
FIG. 3 shows a schematic flow diagram in a third exemplary embodiment of the photographing method by smart television in the present disclosure.

Further, based on the first exemplary embodiment, the schematic flow diagram in a third exemplary embodiment is provided of the photographing method by the smart television in the present disclosure, referring to FIG. 3. In the third exemplary embodiment, the photographing method by the smart television after S20 includes:

step S60, indicating the user directly to be photographed, when the brightness value of current environment is not less than the preset value.

In the exemplary embodiment, when the brightness value of current environment is not less than the preset value, indicating high brightness of the environment of the smart television. Thus, it is not necessary to adjust the screen brightness of the smart television, and the user could be directly indicated to be photographed. For example, a question of "if a photo would like to be taken" would be popped up and the user's selection would be accepted.

The present exemplary embodiment indicates a user directly to be photographed, when the brightness value of the environment is not less than the preset value. Thus, as the brightness value of the environment is less than the preset value, the screen brightness needs to be adjusted to the required screen brightness before indicating the user to be photographed. If the brightness value of the environment is not less than the preset value, the user would be directly indicated to be photographed. The photographing mode is dynamically adjusted and changed with the brightness of the current environment. The user's requirement is fulfilled on environment brightness for camera of the smart television during photographing, and the user experience is thus improved.

Figure 4:
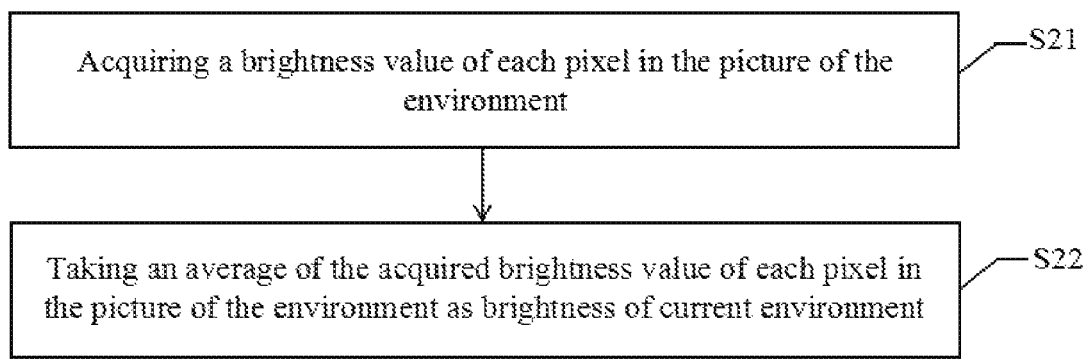
FIG. 4 shows a schematic flow diagram with detailed steps of S20 in the first exemplary embodiment shown in FIG. 1.

Further, FIG. 4 is referred to, which shows a schematic flow diagram with detailed steps of S20 showing the first exemplary embodiment. The detailed steps of S20 includes:

step S21, acquiring a brightness value of each pixel in the picture of the environment;

step S22, taking an average of the acquired brightness value of each pixel in the picture of the environment as the brightness value of the environment.

In the present exemplary embodiment, the picture of environment is screenshot, displayed on the current viewfinder interface of the smart television and a brightness value of each pixel in the picture of the environment is acquired, during photographing by the smart television. Since the brightness value of each pixel in the picture of the environment is directly output by the camera (a photosensitive element), which is image data without any processing, the brightness value of each pixel in the picture of the environment could be named as raw data. All the raw data of the picture of the environment are counted when acquired, or part of the raw data is selected deliberately and this part of the raw data are accumulated and averaged. The average value is taken as the brightness of the current environment of the smart television.

The present exemplary embodiment enables calculation more precisely for the brightness of the current environment, by means of acquiring a brightness value of each pixel in the picture of the environment, and taking an average of the acquired brightness value of each pixel in the picture of the environment as brightness value of the environment.

Figure 5:
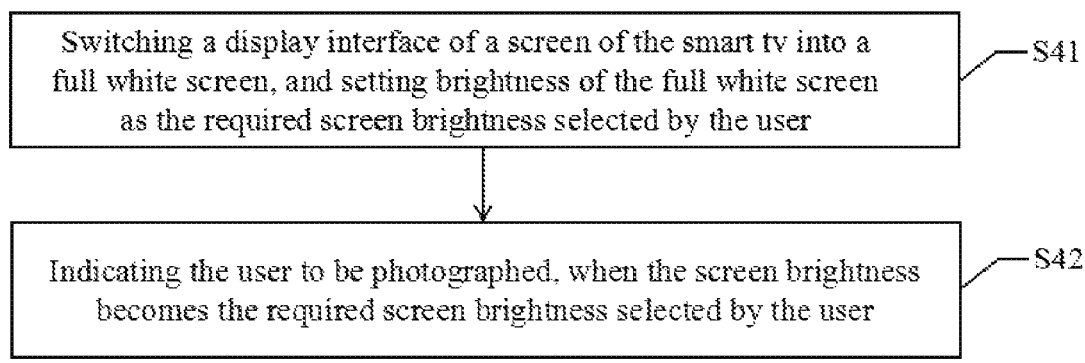
FIG. 5 shows a schematic flow diagram with detailed steps of S40 in the first exemplary embodiment shown in FIG. 1.

Further. FIG. 5 is referred to, which shows a schematic flow diagram with detailed steps of S40 showing the first exemplary embodiment. The detailed steps of S40 includes:

step S41, switching the display interface of the screen of the smart television into the full white screen, and setting brightness of the full white screen as the required screen brightness selected by the user;

step S42, indicating the user to be photographed, after the screen brightness becomes the required screen brightness selected by the user.

In the present exemplary embodiment, the display interface of the screen of the smart television is switched into the full white screen in the time of the camera photographing based on the required screen brightness, in order to increase the brightness of the display and to enable the camera to photograph under the full white screen. During photographing, flash is performed on the display of the smart television based on the full white screen. R value, G value and B value of each pixel in the full white screen are 255 for each.

The present exemplary embodiment indicates the user to be photographed, by means of switching the display interface of the screen of the smart television into the full white screen, and setting brightness of the full white screen as the required screen brightness selected by the user. As the display interface of the screen of the smart television is switched into the full white screen, enabling the luminescence efficiency to be the highest without the environment color being changed. Even if the smart television is placed at a relatively dark environment, the user can still be photographed clearly via the smart television.

The present disclosure further provides the photographing system of smart television.

Figure 6:
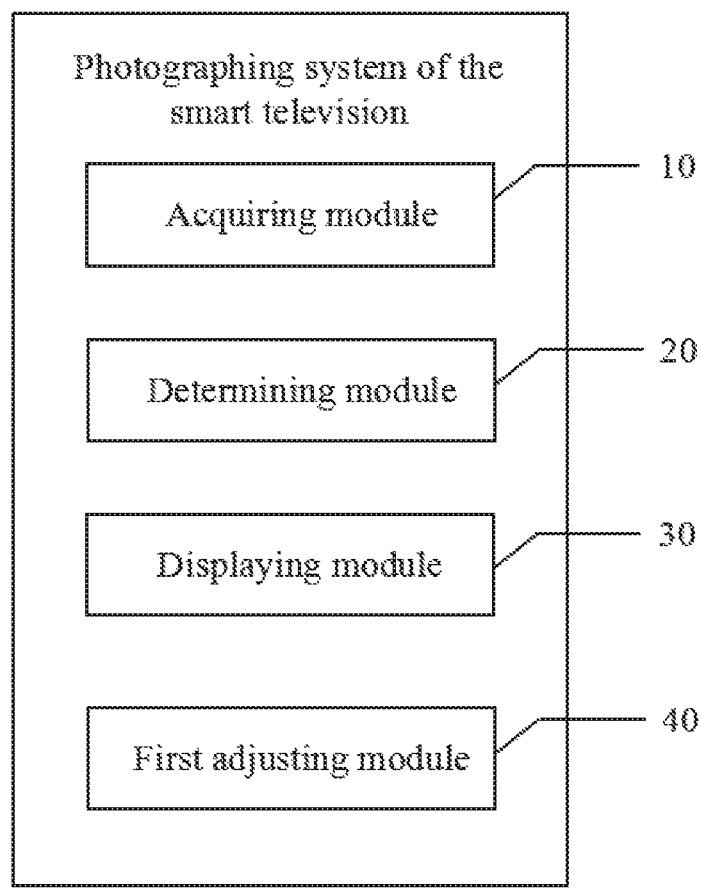
FIG. 6 shows a schematic diagram of functional modules in the first exemplary embodiment of the photographing system of smart television in the present disclosure.

Referring to FIG. 6, showing a schematic diagram of the functional modules in the first exemplary embodiment of the photographing system of smart television in the present disclosure.

In the first exemplary embodiment, the photographing system of smart television includes: the acquiring module 10, the determining module 20, the displaying module 30 and the first adjusting module 40.

The acquiring module 10, acquires a picture of an environment captured by the camera of the smart television, when the smart television is photographing.

The determining module 20, determines the brightness value of current environment of the smart television, based on the picture of the environment.

In the present exemplary embodiment, when it is detected that the user opens an APP on the smart television for photographing, the current picture of the environment would be captured by the camera linked with the smart television, which is then displayed on a viewfinder interface. When the user presses camera key and the photographing process is detected, the acquiring module 10 acquires the picture of the environment captured by the camera of the smart TV. And the determining module 20 determines the brightness value of current environment of the smart television, based on the brightness value corresponding to the picture of the environment. The picture of the environment acquired by the acquiring module 10 could be a full picture of the environment in the viewfinder interface of the smart television, or it could also be a portion thereof. The brightness range of the current environment of the smart television is [0, 255].

The displaying module 30, gradually increases screen brightness of the smart television and displays a preview image of the picture at different screen brightness, when the current brightness value of the environment is less than a preset value.

When the determining module 20 determines the brightness value of current environment of the smart television, the indicating module 30 compares the current brightness value of the environment with the preset value, determining if the brightness value of the current environment is less than the preset value. If the brightness value of the current environment is less than the preset value, parameters regarding the screen brightness of the smart television would be adjusted according to the current brightness value of the environment, to gradually increase the screen brightness of the smart television. In the meanwhile, the preview image of the picture would be displayed at the adjusted screen brightness. The parameters regarding the screen brightness may include a backlight value, a brightness value and a contrast ratio. For example, the captured brightness value of the current environment of the smart television is Lt, and the preset value of the smart television is L0. Lt is compared with L0. If Lt is less than L0, parameters regarding the screen brightness of the smart television would be adjusted according to Lt, and the screen brightness of the smart television would be gradually increased. And the preview image of the picture would also be shown at the adjusted screen brightness. The range of the preset value is [65, 75].

The first adjusting module 40, adjusts the screen brightness to the required screen brightness selected by the user, for the user to be photographed, after a required screen brightness is selected by the user according to the preview image of the picture.

After the user press the camera key on the APP for photographing, the displaying module 30 displays each preview image of the picture captured by the camera on the display interface of the smart television. In the meanwhile, the user is indicated if the screen brightness corresponding to the preview image of the picture is set as the screen brightness that would be required for further photographing. For example, when the user clicks some preview image of the picture, a question that "if the screen brightness corresponding to the preview image of the picture is set as the screen brightness that would be required for photographing" would be popped up. And the user's selection would be accepted, so that the screen brightness required for further photographing could be rapidly confirmed. Or when the user quits browsing the preview image of the picture, the question that "if the screen brightness corresponding to the preview image of the picture is set as the screen brightness that would be required for photographing" would be popped up. And the user's selection would be accepted. Or users would be indicated of the question at the end of browsing the preview image of the picture, and the user's selection would be accepted. After a required screen brightness is selected by the user according to the preview image of the picture, the first adjusting module 40 adjusts the screen brightness to the selected screen brightness, for the user to be photographed. Flash is performed simultaneously on the display of the smart television when the camera is photographing. When photographing is completed by the camera, the screen brightness of the smart television would be restored to the screen brightness selected by the user.

It has to be noted that if "no" is selected regarding the question "if the screen brightness corresponding to the preview image of the picture is set as the screen brightness that would be required for photographing", when the user clicks some preview image of the picture. Current preview image of the picture would be quit and the user may continue browsing each preview image of the picture.

The smart television of the present exemplary embodiment takes photos by acquiring the picture of the environment captured by the camera of the smart television, when the smart television is photographing, determining the current brightness value of environment of the smart television, based on the picture of the environment, gradually increasing screen brightness of the smart television and showing a preview image of the picture at different screen brightness, when the current brightness value of the environment is less than the preset value; and adjusting the screen brightness to the required screen brightness selected by the user, for the user to be photographed, after a required screen brightness is selected by the user according to the preview image of the picture. The smart television would acquire the current brightness value of the environment during the photographing process. If the current brightness value of the environment is less than the preset value, indicating a dark environment for photographing by the smart television. The user would be clearly photographed through adjusting the screen brightness to the required screen brightness selected by the user, based on the brightness of the current environment. Thus, even if the user is in a dark environment, the camera of the smart television could still take clear photos by aids of the brightness of the smart television.

Figure 7:
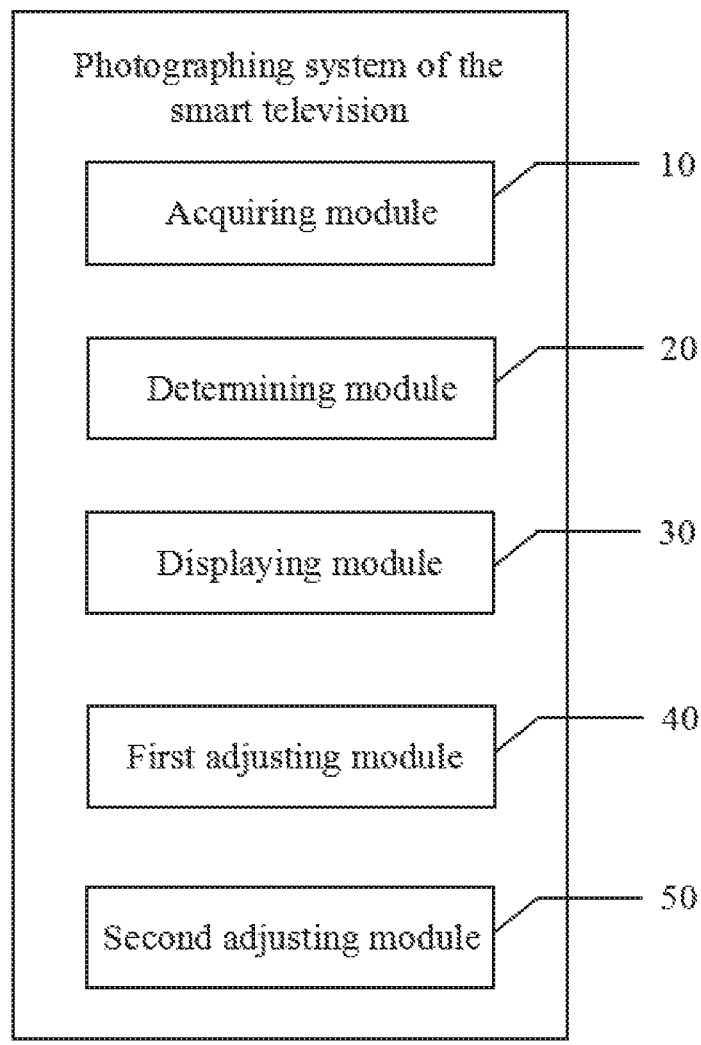
FIG. 7 shows a schematic diagram of functional modules in the second exemplary embodiment of the photographing system of smart television in the present disclosure.

Further, given to the first exemplary embodiment mentioned above, the second exemplary embodiment of the photographing system of smart television is provided. In the second exemplary embodiment of the photographing system of smart television, FIG. 7 is referred to. The photographing system of smart television further includes: the second adjusting module 50.

The second adjusting module 50, saves the brightness value of current environment when the brightness value of current environment is less than the preset value, in order to adjust the screen brightness of the smart television to the current screen brightness after photographing is completed.

If the second adjusting module 50 determines that the brightness value of the current environment of the smart television is less than the preset value in the smart television, indicating dark environment brightness for photographing, and thus clear photos could not be photographed by the camera of the smart television. The screen brightness is necessarily adjusted to the required screen brightness selected by the user, and the current screen brightness of the smart television is saved. Flash is performed simultaneously on the display of the smart television when the camera is photographing with the required screen brightness. When photographing is completed by the camera, the screen brightness of the smart television would be restored to the current screen brightness of the smart television just saved. Thus, other operations, such as displaying pictures, is performed under the current screen brightness of the smart television just saved. For example, if the brightness value of the current environment is Lt1 (Lt1=60), which is less than the preset value L0 (L0=70), Lt2 would be saved and Lt2 would be adjusted to the required screen brightness selected by the user, which is Lt3 (Lt3=80). Flash is performed simultaneously on the display of the smart television when the camera is photographing at the brightness of Lt3. When photographing is completed by the camera, the screen brightness Lt3 would be restored to Lt2.

It could be understandable that the darker of the current environment of the smart television, the smaller of the brightness value of the current environment of the smart television, the larger of the required screen brightness value. And the brighter of the current environment of the smart television, the larger of the brightness value of the current environment of the smart television, the smaller of the required screen brightness value.

The present exemplary embodiment, when the brightness value of current environment is less than the preset value, avoids the screen from possibility of aging under a high brightness condition for a long time, by means of saving the current brightness value of environment, and adjusting the screen brightness of the smart television to the current brightness of environment after photographing is completed.

Figure 8:
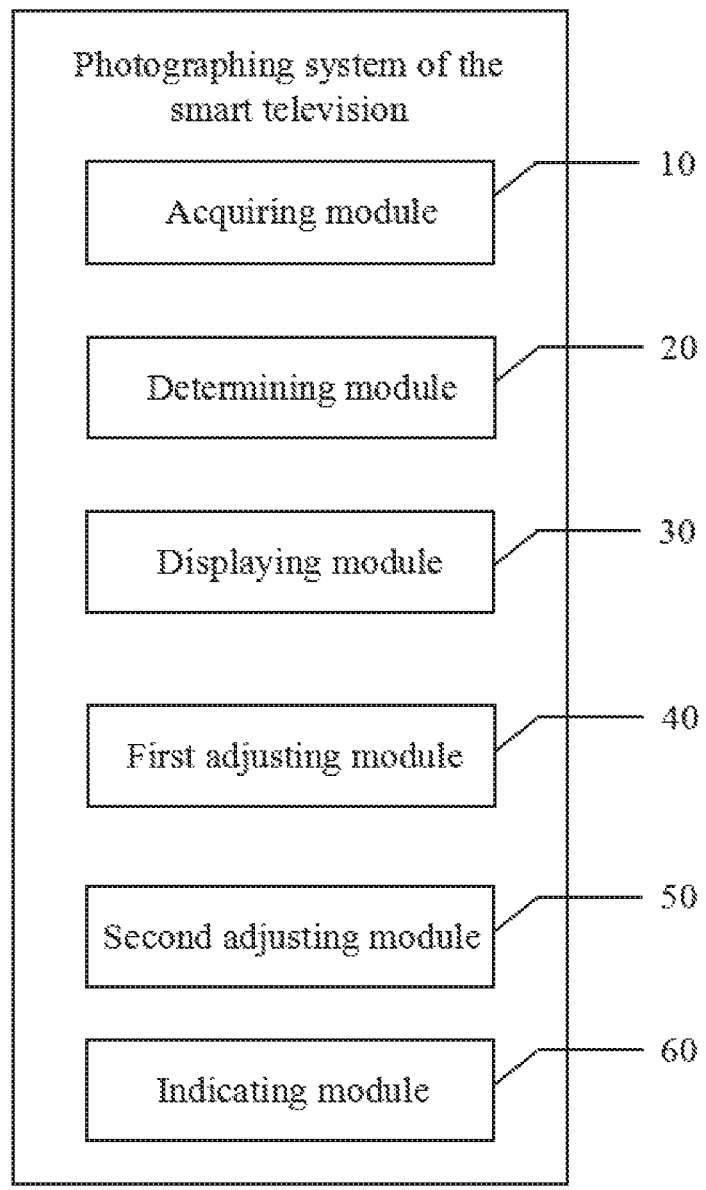
FIG. 8 shows a schematic diagram of functional modules in the third exemplary embodiment of photographing system of smart television in the present disclosure.

Further, given to the first exemplary embodiment mentioned above, the third exemplary embodiment of the photographing system of smart television is provided. In the third exemplary embodiment of the photographing system of smart television, FIG. 8 is referred to. The photographing system of smart television further includes: the indicating module 60.

The indicating module 60, indicates a user to be photographed, when the brightness value of the environment is not less than the preset value.

In the third exemplary embodiment, when the brightness value of current environment is not less than the preset value, indicating high brightness of the environment of the smart television. Thus, it is not necessary to adjust the screen brightness of the smart television, and the indicating module 60 indicates directly the user to be photographed. For example, a question of "if a photo would like to be taken" could be popped up and the user's selection would be accepted.

The present exemplary embodiment indicates a user directly to be photographed, when the brightness value of the environment is not less than the preset value. Thus, as the brightness value of the environment is less than the preset value, the screen brightness needs to be adjusted to the required screen brightness before indicating the user to be photographing. If the brightness value of the environment is not less than the preset value, the user would be directly indicated to be photographed. The photographing mode is dynamically adjusted and changed with the brightness of the current environment. The user's requirement is fulfilled on environment brightness for camera of the smart television during photographing, and the user experience is thus improved.

Figure 9:
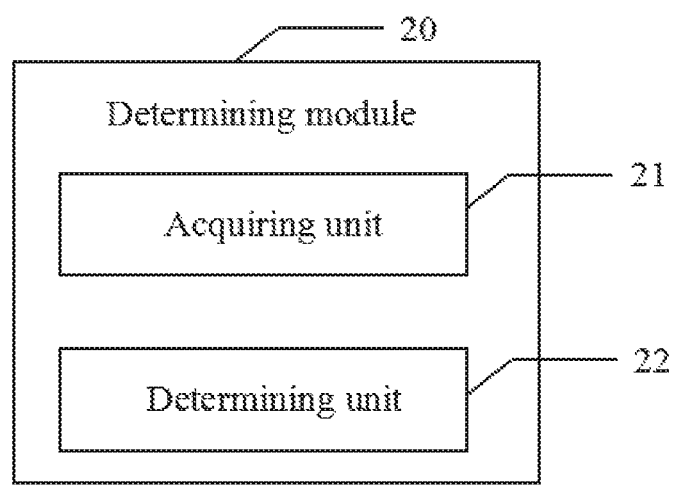
FIG. 9 shows a schematic diagram of detailed functional modules of the determining modules in the fourth exemplary embodiment of the photographing system of smart television in the present disclosure.

Further, given to the first exemplary embodiment mentioned above, the fourth exemplary embodiment of the photographing system of smart television is provided. In the fourth exemplary embodiment of the photographing system of smart television, FIG. 9 is referred to. The determining module further includes: the acquiring unit 21 and the determining unit 22.

The acquiring unit 21, is configured to acquire brightness of each pixel in the picture of the environment.

The determining unit 22, takes an average of the acquired brightness value of each pixel in the picture of the environment as the brightness value of the environment.

In the fourth exemplary embodiment, the picture of environment is screenshot displayed on the current viewfinder interface of the smart television, and the acquiring unit 21 acquires a brightness value of each pixel in the picture of the environment, when photographing is performed by the smart television. Since the brightness value of each pixel in the picture of the environment is directly output by the camera (a photosensitive element), which is image data without any processing, the brightness value of each pixel in the picture of the environment could be named as raw data. All the raw data of the picture of the environment are counted when acquired, or part of the raw data is selected deliberately and the determining unit 22 accumulates this part of the raw data and average the accumulated raw data. The average value is taken as the brightness of the current environment of the smart television.

The present exemplary embodiment enables calculation more precisely for the brightness of the current environment, by means of acquiring a brightness value of each pixel in the picture of the environment, and taking an average of the acquired brightness value of each pixel in the picture of the environment as brightness value of the environment.

Figure 10:
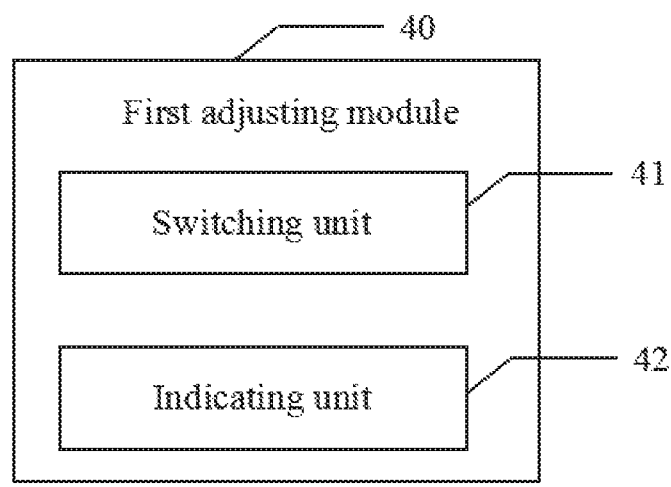
FIG. 10 shows a schematic diagram of detailed functional modules of the first adjusting modules in the fifth exemplary embodiment of the photographing system of smart television in the present disclosure.

Further, given to any exemplary embodiment mentioned above, the fifth exemplary embodiment of the photographing system of smart television is provided. In the fifth exemplary embodiment of the photographing system of smart television, FIG. 10 is referred to. The first adjusting module includes: the switching unit 41 and the indicating unit 42.

The switching unit 41, is configured to switch the display interface of the screen of the smart television into the full white screen, and to set brightness of the full white screen as the required screen brightness selected by the user.

The indicating unit 42, is configured to indicate the user to be photographed, when the screen brightness becomes the required screen brightness selected by the user.

In the fifth exemplary embodiment, the switching unit 41 switches the display interface of the screen of the smart television into the full white screen in the time of the camera photographing based on the required screen brightness, in order to increase the brightness of the display. The indicating unit 42 indicates the users to be photographed and enables the camera to photograph under the full white screen. During photographing, flash is performed on the display of the smart television based on the full white screen. R value, G value and B value of each pixel in the full white screen are 255 for each.

The fifth exemplary embodiment indicates the user to be photographed, by means of switching the display interface of the screen of the smart television into the full white screen, and setting brightness of the full white screen as the required screen brightness selected by the user. As the display interface of the screen of the smart television is switched into the full white screen, enabling the luminescence efficiency to be the highest. Moreover, without changing the environment color. Even if the smart television is placed at a relatively dark environment, the user can still be photographed clearly via the smart television.

The above is only preferred exemplary embodiments of the present disclosure, but not intended to limit the scope of the present disclosure. Any equivalent structure or any equivalent process transformations perceived from the specification and the drawings of the present disclosure, directly or indirectly applied to other related technical fields, should be included in the protection scope of the present disclosure.

What is claimed is:

1. A photographing method by smart television, comprising:
    acquiring a picture of an environment captured by a camera of a smart television, in response that the smart television is photographing;
    acquiring a brightness value of each pixel in the picture of the environment;
    taking an average of the acquired brightness value of each pixel in the picture of the environment as a brightness value of current environment;
    indicating directly a user to be photographed in response that the brightness value of current environment is not less than a preset value;
    saving a current screen brightness, in response that the brightness value of current environment is less than the preset value;
    gradually increasing screen brightness of the smart television and showing a preview image of the picture at different screen brightness in response that the brightness value of the current environment is less than the preset value; and
    adjusting the screen brightness to a required screen brightness for the user to be photographed, after the required screen brightness is selected by the user according to the preview image of the picture; and
    restoring the screen brightness of the smart television to the current screen brightness previously saved, wherein
    the step of adjusting the screen brightness to a required screen brightness selected by the user, for the user to be photographed, comprises:
    switching a display interface of a screen of the smart television into a full white screen, and setting brightness of the full white screen as the required screen brightness selected by the user; and
    indicating the user to be photographed, when the screen brightness becomes the required screen brightness selected by the user;
    and wherein a flash is performed on the screen of the smart television based on the full white screen.

2. A photographing method by smart television, comprising:
    acquiring a picture of an environment captured by a camera of a smart television, in response that the smart television is photographing;
    determining a brightness value of current environment of the smart television, based on the picture of the environment;
    saving a current screen brightness, in response that the brightness value of current environment is less than the preset value;
    gradually increasing screen brightness of the smart television and showing a preview image of the picture at different screen brightness, in response that the brightness value of the current environment is less than a preset value;
    adjusting the screen brightness to a required screen brightness selected by the user, for the user to be photographed, after the required screen brightness is selected by the user according to the preview image of the picture; and
    restoring the screen brightness of the smart television to the current screen brightness previously saved, wherein
    the step of adjusting the screen brightness to a required screen brightness selected by the user, for the user to be photographed, comprises:
    switching a display interface of a screen of the smart television into a full white screen, and setting brightness of the full white screen as the required screen brightness selected by the user; and
    indicating the user to be photographed, when the screen brightness becomes the required screen brightness selected by the user;
    and wherein a flash is performed on the screen of the smart television based on the full white screen.

3. The method of claim 2, wherein the step of adjusting the screen brightness to a required screen brightness selected by the user, for the user to be photographed, comprises:
    switching a display interface of a screen of the smart television into a full white screen, and setting brightness of the full white screen as the required screen brightness selected by the user; and
    indicating the user to be photographed, when the screen brightness becomes the required screen brightness selected by the user.

4. The method of claim 2, wherein the method further comprises:
    indicating directly a user to be photographed when the brightness value of the environment is not less than the preset value.

5. The method of claim 4, wherein the step of adjusting the screen brightness to a required screen brightness selected by the user, for the user to be photographed, comprises:
    switching a display interface of a screen of the smart television into a full white screen, and setting brightness of the full white screen as the required screen brightness selected by the user; and
    indicating the user to be photographed, when the screen brightness becomes the required screen brightness selected by the user.

6. The method of claim 2, wherein the step of determining the brightness of current environment of the smart television, based on the picture of the environment, comprises:
    acquiring a brightness value of each pixel in the picture of the environment; and
    taking an average of the acquired brightness value of each pixel in the picture of the environment as the brightness value of the current environment.

7. The method of claim 6, wherein the step of adjusting the screen brightness to a required screen brightness selected by the user, for the user to be photographed, comprises:
    switching a display interface of the screen of the smart television into a full white screen, and setting brightness of the full white screen as the required screen brightness selected by the user; and indicating the user to be photographed, when the screen brightness becomes the required screen brightness selected by the user.

8. A photographing system of smart television, comprising:
- an acquiring module, configured to acquire a picture of an environment captured by a camera of a smart television, in response that the smart television is photographing;
- a determining module, configured to determine a brightness value of current environment of the smart television, based on the picture of the environment;
- a displaying module, configured to gradually increase screen brightness value of the smart television and to show a preview image of the picture at different screen brightness, in response that the brightness value of the current environment is less than a preset value; and
- a first adjusting module, configured to adjust the screen brightness to a required screen brightness selected by the user, for the user to be photographed, after the required screen brightness is selected by the user according to the preview image of the picture; and
- a second adjusting module, configured to save a screen brightness before increasing the screen brightness value, and restore the screen brightness previously saved once photographing is completed, wherein
the first adjusting module comprises:
- a switching unit, configured to switch a display interface of a screen of the smart television into a full white screen, and to set brightness of the full white screen as the required screen brightness selected by the user;
- an indicating unit, configured to indicate the user to be photographed, when the screen brightness becomes the required screen brightness selected by the user,
and wherein a flash is performed on the screen of the smart television based on the full white screen.

9. The photographing system of claim 8, wherein the first adjusting module comprises:
- a switching unit, configured to switch a display interface of a screen of the smart television into a full white screen, and to set brightness of the full white screen as the required screen brightness selected by the user; and
- an indicating unit, configured to indicate the user to be photographed, in response that the screen brightness becomes the required screen brightness selected by the user.

10. The photographing system of claim 8, wherein the photographing system further comprises:
- an indicating module, configured to directly indicate the user to be photographed, when the current brightness value of the environment is not less than the preset value.

11. The photographing system of claim 10, wherein the photographing system further comprises:
- a switching unit, configured to switch a display interface of a screen of the smart television into a full white screen, and to set brightness of the full white screen as the required screen brightness selected by the user; and
- an indicating unit, configured to indicate the user to be photographed, when the screen brightness becomes the required screen brightness selected by the user.

12. The photographing system of claim 8, wherein the determining module further comprises:
- an acquiring unit, configured to acquire a brightness value of each pixel in the picture of the environment; and
- a determining unit, configured to take an average of the acquired brightness value of each pixel in the picture of the environment as the brightness value of the current environment.

13. The photographing system of claim 12, wherein the first adjusting module comprises:
- a switching unit, configured to switch a display interface of a screen of the smart television into a full white screen, and to set brightness of the full white screen as the required screen brightness selected by the user; and
- an indicating unit, configured to indicate the user to be photographed, when the screen brightness becomes the required screen brightness selected by the user.

* * * * *